US012792377B2

(12) United States Patent
Rathinam et al.

(10) Patent No.: US 12,792,377 B2
(45) Date of Patent: Nov. 10, 2026

(54) NETWORK SERVICE MANAGEMENT APPARATUS AND NETWORK SERVICE MANAGEMENT METHOD

(71) Applicant: Rakuten Symphony, Inc., Tokyo (JP)

(72) Inventors: Bharath Rathinam, Tokyo (JP); Sheshan De Zoysa, Tokyo (JP); Rahul Atri, Singapore (SG)

(73) Assignee: RAKUTEN SYMPHONY, INC., Tokyo (JP)

( * ) Notice: Subject to any disclaimer, the term of this patent is extended or adjusted under 35 U.S.C. 154(b) by 689 days.

(21) Appl. No.: 18/022,653

(22) PCT Filed: Feb. 12, 2021

(86) PCT No.: PCT/IB2021/051163

§ 371 (c)(1),
(2) Date: Feb. 22, 2023

(87) PCT Pub. No.: WO2022/172063

PCT Pub. Date: Aug. 18, 2022

(65) Prior Publication Data

US 2024/0036905 A1 Feb. 1, 2024

(51) Int. Cl.
*G06F 9/455* (2018.01)

(52) U.S. Cl.
CPC .................... *G06F 9/45558* (2013.01); *G06F 2009/45562* (2013.01); *G06F 2009/4557* (2013.01)

(58) Field of Classification Search
CPC ....... G06F 9/45558; G06F 2009/45562; G06F 2009/4557
See application file for complete search history.

(56) References Cited

U.S. PATENT DOCUMENTS

| | | | | |
|---|---|---|---|---|
| 10,379,922 | B1 | 8/2019 | Bell et al. | |
| 11,474,918 | B1 * | 10/2022 | Sandlerman | G06F 11/1484 |
| 2014/0149783 | A1 | 5/2014 | Georgiev | |
| 2016/0170848 | A1 * | 6/2016 | Yang | G06F 11/2023 714/4.12 |
| 2016/0321139 | A1 | 11/2016 | Kitamoto et al. | |
| 2017/0264587 | A1 | 9/2017 | Ju et al. | |

(Continued)

FOREIGN PATENT DOCUMENTS

| | | | |
|---|---|---|---|
| JP | 2006-237960 | A | 9/2006 |
| JP | 2009-253743 | A | 10/2009 |

(Continued)

OTHER PUBLICATIONS

"Network Functions Virtualisation (NFV); Architectural Framework", ETSI GS NFV 002 v1.1.1, Oct. 2013, pp. 1-21.

(Continued)

*Primary Examiner* — Dong U Kim
(74) *Attorney, Agent, or Firm* — Sughrue Mion, PLLC

(57) ABSTRACT

A migration controller of a network service management apparatus requests, upon detection of the necessity of replacing redundant hardware running on a network system with another hardware, an orchestration unit to disable the redundant hardware. Further, issuing a request to delete a virtual machine on the redundant hardware to a virtualized infrastructure manager causes the network system to perform a failure recovery process to redeploy the virtual machine to hardware after replacement.

10 Claims, 14 Drawing Sheets

(56) References Cited

U.S. PATENT DOCUMENTS

| | | | | |
|---|---|---|---|---|
| 2017/0293500 | A1* | 10/2017 | Molina | G06F 9/45558 |
| 2018/0024898 | A1 | 1/2018 | Yoshikawa | |
| 2018/0234288 | A1 | 8/2018 | Soderlund | |
| 2018/0316543 | A1* | 11/2018 | Hwang | G06F 9/45558 |
| 2019/0102717 | A1 | 4/2019 | Wu et al. | |
| 2020/0145299 | A1 | 5/2020 | Do et al. | |

FOREIGN PATENT DOCUMENTS

| | | | |
|---|---|---|---|
| JP | 2018-029344 | A | 2/2018 |
| WO | 2016/125387 | A1 | 8/2016 |

OTHER PUBLICATIONS

International Search Report for PCT/IB2021/051163 dated Apr. 27, 2021 [PCT/ISA/210].

Communication dated Jul. 12, 2024 issued by the United States Patent and Trademark Office in U.S. Appl. No. 18/004,709.

United States Office Action issued Aug. 30, 2023 in U.S. Appl. No. 18/003,411.

United States Office Action issued Aug. 25, 2023 in U.S. Appl. No. 18/023,549.

* cited by examiner

FIG.8

| GROUP | HARDWARE | HOST NAME | VIRTUAL MACHINE | VNFC | VNF | PRESENCE OR ABSENCE OF FAILURE | CAUSE | DETAILED INFORMATION |
|---|---|---|---|---|---|---|---|---|
| 01 | A01A | AAA | aaa01 | aaa11 | 0001 | 0 | — | — |
| | | | aaa02 | aaa12 | | | | |
| | | | aaa03 | aaa13 | 0002 | 1 | 1 | ... |
| | B01B | BBB | bbb01 | bbb11 | | | | |
| | | | bbb02 | bbb12 | | | | |
| | ... | ... | ... | ... | ... | ... | ... | ... |
| 02 | P02P | PPP | ppp01 | ppp11 | 0015 | 1 | 0 | ... |
| | | | ppp02 | ppp12 | | | | |
| | | | ppp03 | ppp13 | | | | |
| | ... | ... | ... | ... | ... | ... | ... | ... |
| ... | ... | ... | ... | ... | ... | ... | ... | ... |

82

FIG.12

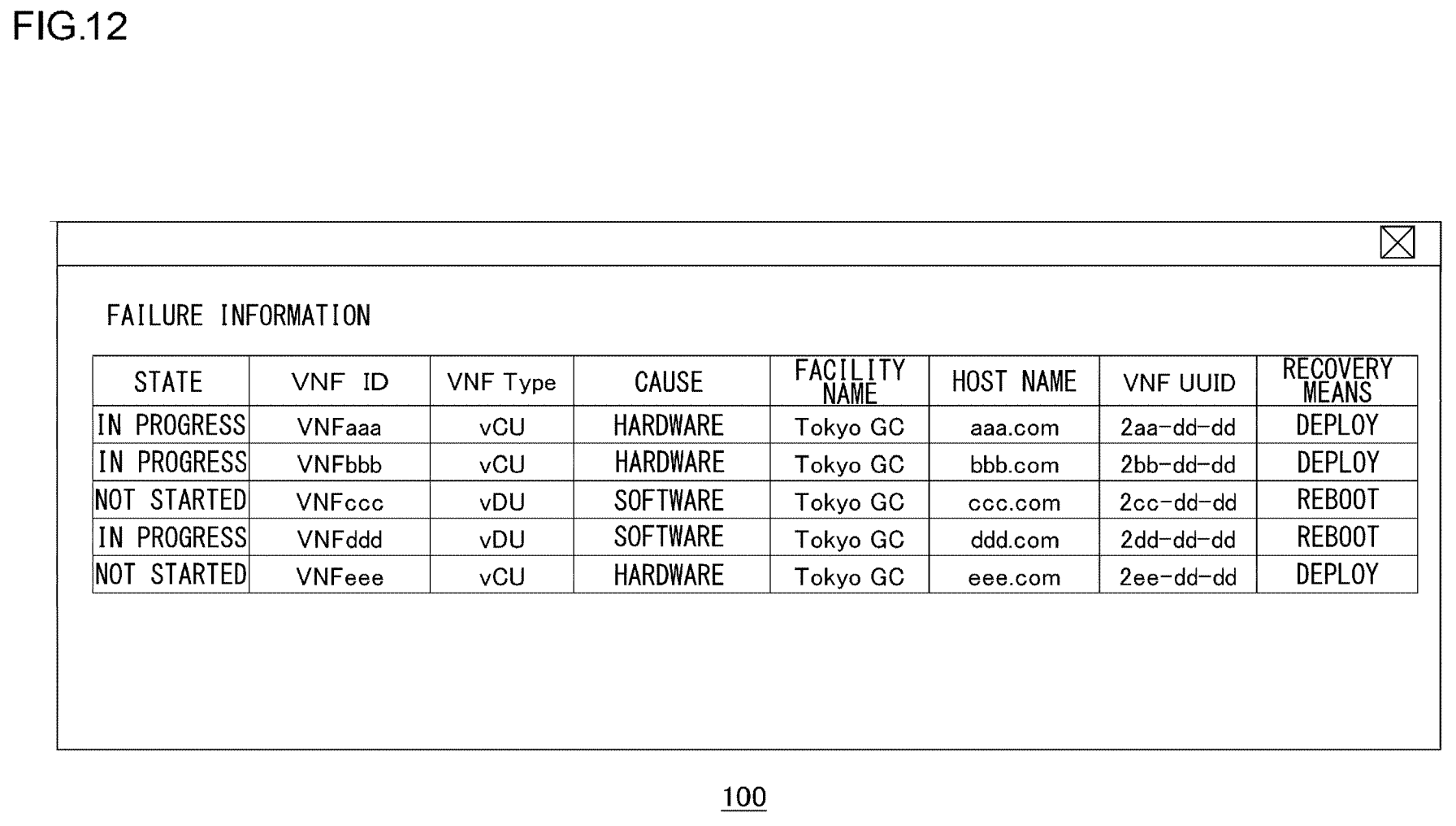

FAILURE INFORMATION

| STATE | VNF ID | VNF Type | CAUSE | FACILITY NAME | HOST NAME | VNF UUID | RECOVERY MEANS |
|---|---|---|---|---|---|---|---|
| IN PROGRESS | VNFaaa | vCU | HARDWARE | Tokyo GC | aaa.com | 2aa-dd-dd | DEPLOY |
| IN PROGRESS | VNFbbb | vCU | HARDWARE | Tokyo GC | bbb.com | 2bb-dd-dd | DEPLOY |
| NOT STARTED | VNFccc | vDU | SOFTWARE | Tokyo GC | ccc.com | 2cc-dd-dd | REBOOT |
| IN PROGRESS | VNFddd | vDU | SOFTWARE | Tokyo GC | ddd.com | 2dd-dd-dd | REBOOT |
| NOT STARTED | VNFeee | vCU | HARDWARE | Tokyo GC | eee.com | 2ee-dd-dd | DEPLOY |

100

NETWORK SERVICE MANAGEMENT APPARATUS AND NETWORK SERVICE MANAGEMENT METHOD

CROSS REFERENCE TO RELATED APPLICATIONS

This application is a National Stage of International Application No. PCT/IB2021/051163 filed Feb. 12, 2021.

TECHNICAL FIELD

The present invention relates to a network service management apparatus and a network service management method for managing a system that provides a network service.

BACKGROUND ART

A network functions virtualization (NFV) technology for virtualizing, in a server that implements a network, hardware resources via a virtual machine implemented on a virtualization layer to implement a network service is known (for example, see Non Patent Literature 1). The NFV allows a network function to be implemented without installing a physical dedicated device and thus allows a reduction in cost of installation and operation of equipment.

On the other hand, according to the NFV, a large number of physical devices and virtualized functions are associated with each other in a complicated manner, so that once a failure occurs, it is difficult to find the cause of the failure. Therefore, various techniques have been proposed as technology related to failure recovery (see, for example, Patent Literature 1 and 2).

CITATION LIST

Patent Literature

[Patent Literature 1] WO 2016/125387 A
[Patent Literature 2] JP 2018-29344 A

Non Patent Literature

[Non Patent Literature 1]: ETSI GS NFV 002 V1.1.1 (2013-10), Network Functions Virtualization (NFV); Architectural Framework, searched on the Internet on Oct. 21, 2020 <URL:https://www.etsi.org/deliver/etsi_gs/NFV/001_099/002/01.01.01_60/gs_NFV002v010101p.pdf>

SUMMARY OF INVENTION

Technical Problem

A temporary stop of a function of a network service due to the occurrence of a failure or maintenance work may greatly affect many companies and users who use the network service. Therefore, how to achieve efficient recovery is always a critical issue. On the other hand, when a recovery scheme is designed to address various situations, the recovery process itself becomes complicated, and some failure causes may require a lot of time for recovery. Further, even when one piece of hardware is replaced for the purpose of maintenance or the like, it is often required that large-scale work including interruption of the entire network be made in view of safety.

The present invention has been made in view of such problems, and it is therefore an object of the present invention to provide a technique for allowing a system via which a network service is implemented to efficiently perform a recovery process after the occurrence of a failure or maintenance work.

Solution to Problem

An aspect of the present invention relates to a network service management apparatus. The network service management apparatus includes a hardware change information acquirer structured to detect necessity of changing any of hardware via which a network service in operation is implemented, and a hardware change controller structured to delete a virtual machine that is built on the hardware to be changed and via which a functional unit of the network service is implemented to cause a manager structured to monitor the network service to detect the deletion and activate a recovery function for hardware after change.

Another aspect of the present invention relates to a network service management method. The network service management method includes detecting necessity of changing any of hardware via which a network service in operation is implemented, and deleting a virtual machine that is built on the hardware to be changed and via which a functional unit of the network service is implemented to cause a manager structured to monitor the network service to detect the deletion and activate a recovery function for hardware after change.

Note that any combination of the above-described components, or an entity that results from replacing expressions of the present invention among a method, a device, a system, a computer program, a recording medium storing a computer program, and the like is also valid as an aspect of the present invention.

Advantageous Effects of Invention

The present invention allows a system via which a network service is implemented to efficiently perform a recovery process after the occurrence of a failure or maintenance work.

BRIEF DESCRIPTION OF DRAWINGS

FIG. 8 is a diagram illustrating an example of information stored in a resource information storage of the network service management apparatus according to the present embodiment.

FIG. 12 is a diagram illustrating an example of a screen showing failure information displayed by a display of the network service management apparatus according to the present embodiment.

DESCRIPTION OF EMBODIMENTS

Figure 1:
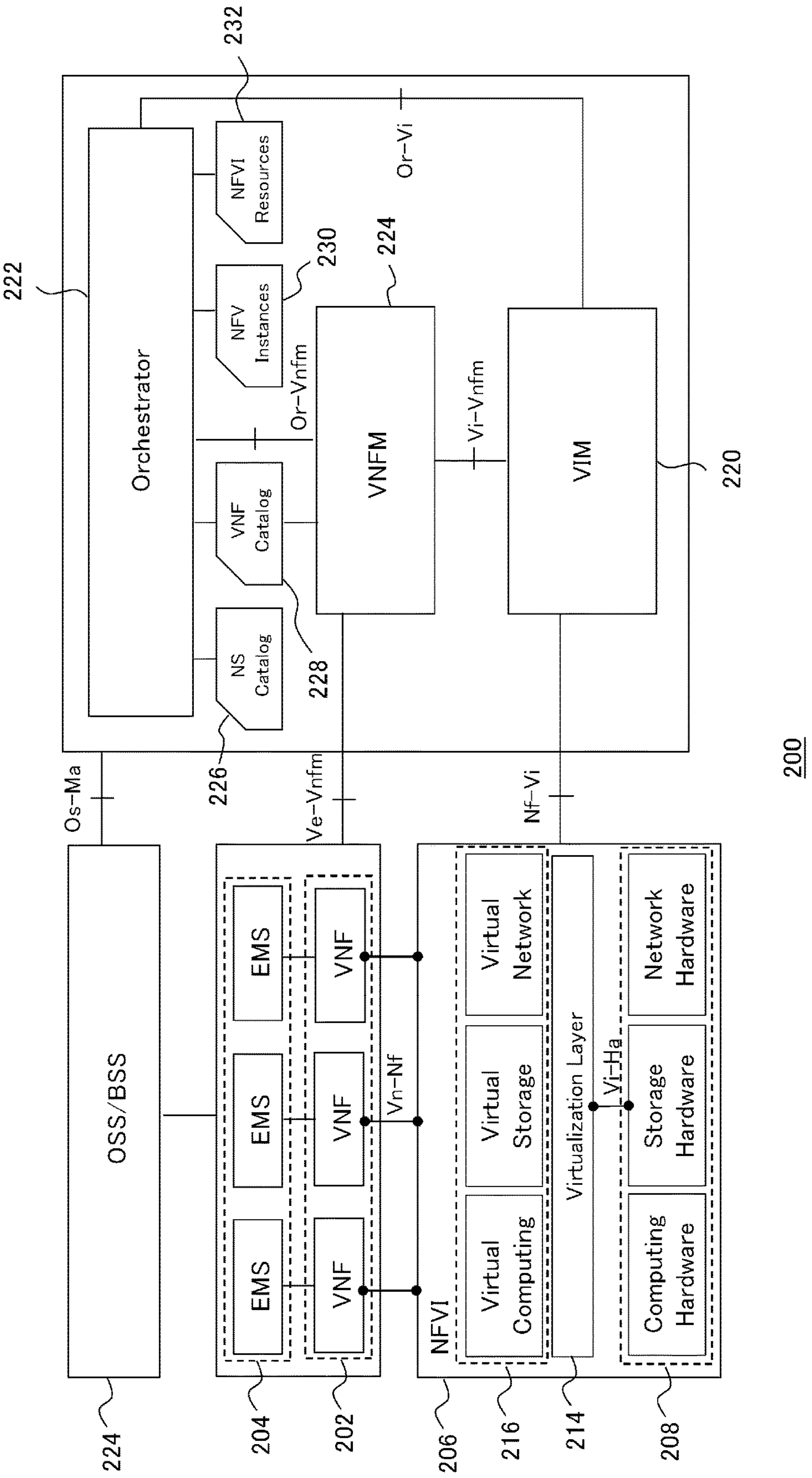
FIG. 1 is a diagram illustrating an NFV framework defined by ETSI to which the present embodiment is applicable.

FIG. 1 illustrates an NFV framework defined by European Telecommunications Standards Institute (ETSI) to which the present embodiment is applicable. In a framework 200, a virtual network function (VNF) 202 is an entity obtained as a result of virtualizing a network function such as a mobility management entity (MME), a serving gateway (SGW), or a packet data network gateway (PGW). The VNF 202 runs on one or more virtual machines (VMs).

An element management system (EMS) 204 manages functions of one or more VNFs 202. A network function virtualization infrastructure (NFVI) 206 includes hardware and software constituting as an execution platform of the VNF 202. Herein, the NFVI 206 includes hardware resources 208 such as a computing resource, a storage resource, and a network resource. Such hardware resources are each virtualized by a virtualization layer 214 such as a hypervisor to build a virtual machine 216.

A virtualized infrastructure manager (VIM) 220 manages interaction between the resources, such as the computing resource, the storage resource, and the network resource, and the VNF 202 via the virtualization layer 214 of the NFVI 206. Specifically, the VIM 220 manages software inventory, the allocation of virtualized functions, the allocation of resources, and the like. The VIM 220 is also responsible for analysis of the performance of the NFVI 206, failure monitoring, and the like.

An orchestrator 222 performs orchestration of the NFVI resources, and management of the life cycle of a network service (NS), that is, instantiation, scaling, termination, update, and the like. A virtual network function manager (VNFM) 224 manages the life cycle of the VNF 202. An operations support systems (OSS)/business support systems (BSS) 224 corresponds to, for example, an information apparatus or software operated by a telecommunications carrier in order to construct or operate a communication service provided to a user.

Among the reference points, virtualization layer-hardware resources (Vi-Ha) serve as an interface between the virtualization layer 214 and the hardware resources 208 for establishing the environment of the VNF 202 and are used for collecting state information on the hardware resources 208. VNF-NFVI (Vn-Nf) provides an execution environment established by the NFVI 206 to the VNF 202. An orchestrator-VNF manager (Or-Vnfm) is used to request resource allocation from the VNFM 224 to the orchestrator 22 or to exchange information on the virtualized hardware resources.

Orchestrator-VIM (Or-Vi) is used to request resource reservation or resource allocation from the orchestrator 222 to the VIM 220 or to exchange information on the virtualized hardware resources. NFVI-VIM (Nf-Vi) is used to respond to the request for resource allocation, to transfer the state information on the virtualized resources, or to exchange information on the hardware resources. OSS/BSS-NFV management and orchestration (Os-Ma) is used to request the management of the life cycle of the NS or the VNF 202, to transfer the state information on the NFV, to exchange policy management, to exchange data analysis, to transfer charging and usage records, or to exchange information on the capacity or inventory of the NFVI 206. A VNF/EMS-VNF manager (Ve-Vnfm) is used to request the management of the life cycle of the VNF 202, to exchange structure information, or to exchange information necessary for the management of the life cycle of the NS.

An NS catalog 226 of the data group represents a repository of the NS. A network service descriptor (NS descriptor) contained in the NS catalog 226 is a deployment template that refers to, for example, a descriptor of the VNF 202 via which the NS is implemented. A VNF catalog 228 represents a repository of VNF packages. A VNF descriptor contained in the VNF catalog 228 is a deployment template used to define the VNF 202 and is referred to by the VNFM 224 for the instantiation of the VNF 202 and the management of the life cycle of the VNF 202. The VNF descriptor is further referred to by the orchestrator 222 for the management and orchestration of virtualized resources.

NFV instances 230 include an NS record, a VNF record, a virtual link record, and the like, in which a result of operation is reflected in the life cycle of each instance of the NS or the VNF 202. NFVI resources 232 represent information on the hardware resources managed by the VIM 220.

In the configuration as described above, a criterion of determination as to whether the VNF 202 is in normal operation or a monitoring rule is set in a key performance indicators (KPI) section of the VNF descriptor. Accordingly, a monitoring agent of the VNFM 224 periodically monitors the VNF 202 to check for abnormality in each VNF component (VNFC) (or each virtual machine) that is the minimum implementation unit of the VNF 202, for example. Targets to be monitored include reachability, the utilization of resources such as a CPU, a memory, a disk, and a network throughput. Note that, for the monitoring, it is required that the VNFC be in operation.

As actions that the VNFM 224 may take when an abnormality is detected, the following options are typically prepared.

1. Attempt to reboot the virtual machine, and when the reboot fails, redeploy the virtual machine;
2. Only reboot the virtual machine; and
3. Only redeploy the virtual machine.

When any of these actions is set in the VNF descriptor, the action thus set is applied to recovery (healing) of a corresponding VNF 202. When a recovery process is automatically performed, the VNFM 224 attempts to recover the VNF 202 to normal in accordance with the setting. For example, with the above-described action 1 set enabled, measures against various failures can be taken. On the other hand, a certain amount of time is required to determine that the reboot is not an option, which requires a wait for a timeout of about 7 or 8 minutes, for example. However, if a failure is caused by hardware, the reboot attempt results in a waste of time.

Further, when a device is replaced as a measure against a failure caused by hardware or the like, all the NS is temporarily stopped, and then instantiation is performed again. The longer the downtime is, the longer a period during which a corresponding service is not available, which causes inconvenience to the user. Therefore, according to the present embodiment, action is applied from the OSS to the existing NFV mechanism to make the recovery process performed in response to the occurrence of a failure or the replacement of a device efficient.

Specifically, according to the present embodiment, the OSS finds a cause of a failure and takes action that affects the operation of the VNFM 224 so as to cause the recovery process to branch in accordance with the cause thus found. For example, the OSS makes an inquiry to the VIM 220 to determine an abnormality in hardware that is difficult for the monitoring agent of the VNFM 224 to detect. In this case, the OSS requests the VIM 220 to update the state information on the virtual machine to a state indicating an abnormality, such as "error". This causes, even when the VNFM 224 starts the above-described action 1, the reboot attempt immediately fails. This allows a reduction in waiting time for a timeout of the reboot.

Further, when a device (hardware) replacement, the OSS to request the VIM 220 to delete the virtual machine running on a device before replacement. This causes the monitoring agent of the VNFM 224 to fail to confirm the presence of the virtual machine and detect the failure as an abnormality. Action such as the above-described action 1 is taken in response to the detection of an abnormality, so that it is possible to build a virtual machine on a device after replacement to return the VNF to normal without work requiring long interruption. As described above, according to the present embodiment, the efficiency of the recovery process is increased using the general functions of the NFV so as to make the downtime as short as possible.

Figure 2:
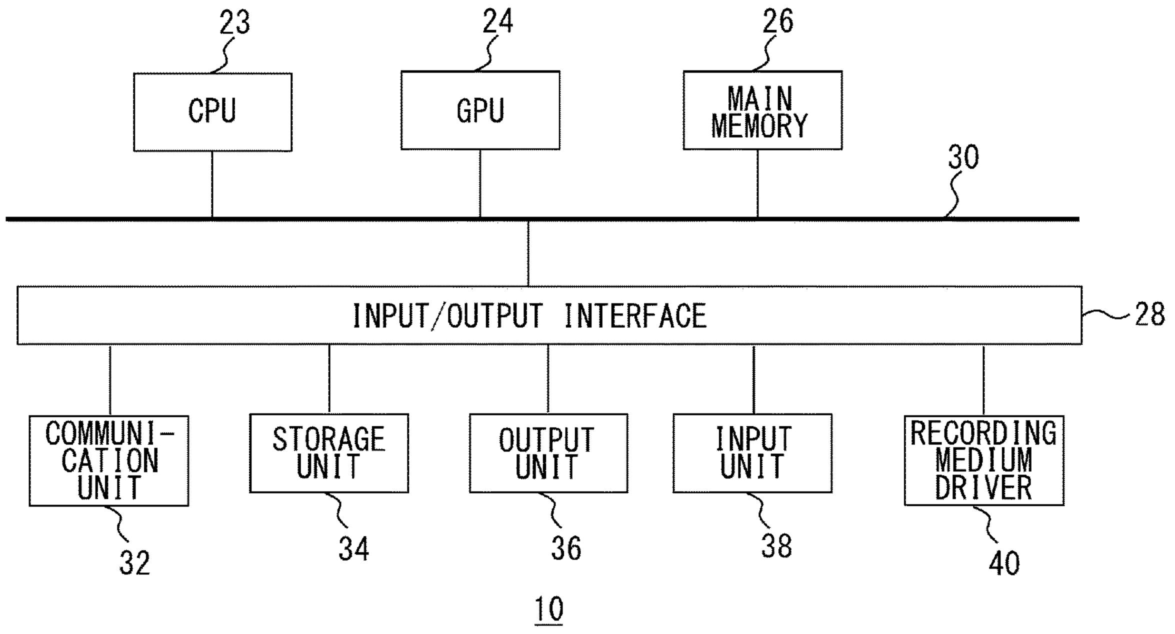
FIG. 2 is a diagram illustrating an internal circuit structure of a network service management apparatus according to the present embodiment.

FIG. 2 is a diagram illustrating an internal circuit structure of a network service management apparatus according to the present embodiment. Herein, the network service management apparatus may be a part of the OSS in the NFV architecture illustrated in FIG. 1. Further, an NFV architecture other than the network service management apparatus is hereinafter referred to as a network system. The present embodiment, however, is not limited to the application to the NFV framework defined by ETSI. That is, in a virtualized network system having a similar recovery process function, a detailed structure of the system to be managed is not limited as long as an interface accessible from the outside is provided in the system.

A network service management apparatus 10 includes a central processing unit (CPU) 23, a graphics processing unit (GPU) 24, and a main memory 26. These components are connected to each other over a bus 30. An input/output interface 28 is further connected to the bus 30. The input/output interface 28 is connected with a communication unit 32 that establishes communication with a network system to be managed, a storage unit 34 such as a hard disk drive or a nonvolatile memory, an output unit 36 that outputs data to a display device (not illustrated) or the like, an input unit 38 that receives data from an input device (not illustrated) or the like, and a recording medium driver 40 that drives a removable recording medium such as a magnetic disk, an optical disc, or a semiconductor memory.

The CPU 23 executes an operating system stored in the storage unit 34 to control the entire network service management apparatus 10. The CPU 23 further executes various programs read from the removable recording medium and loaded into the main memory 26. The GPU 24 generates a display image in accordance with a rendering command from the CPU 23 and outputs the display image to the output unit 36. The main memory 26 includes a random access memory (RAM) and stores programs and data necessary for processing. Each component of the network system to be managed may have a similar structure.

Figure 3:
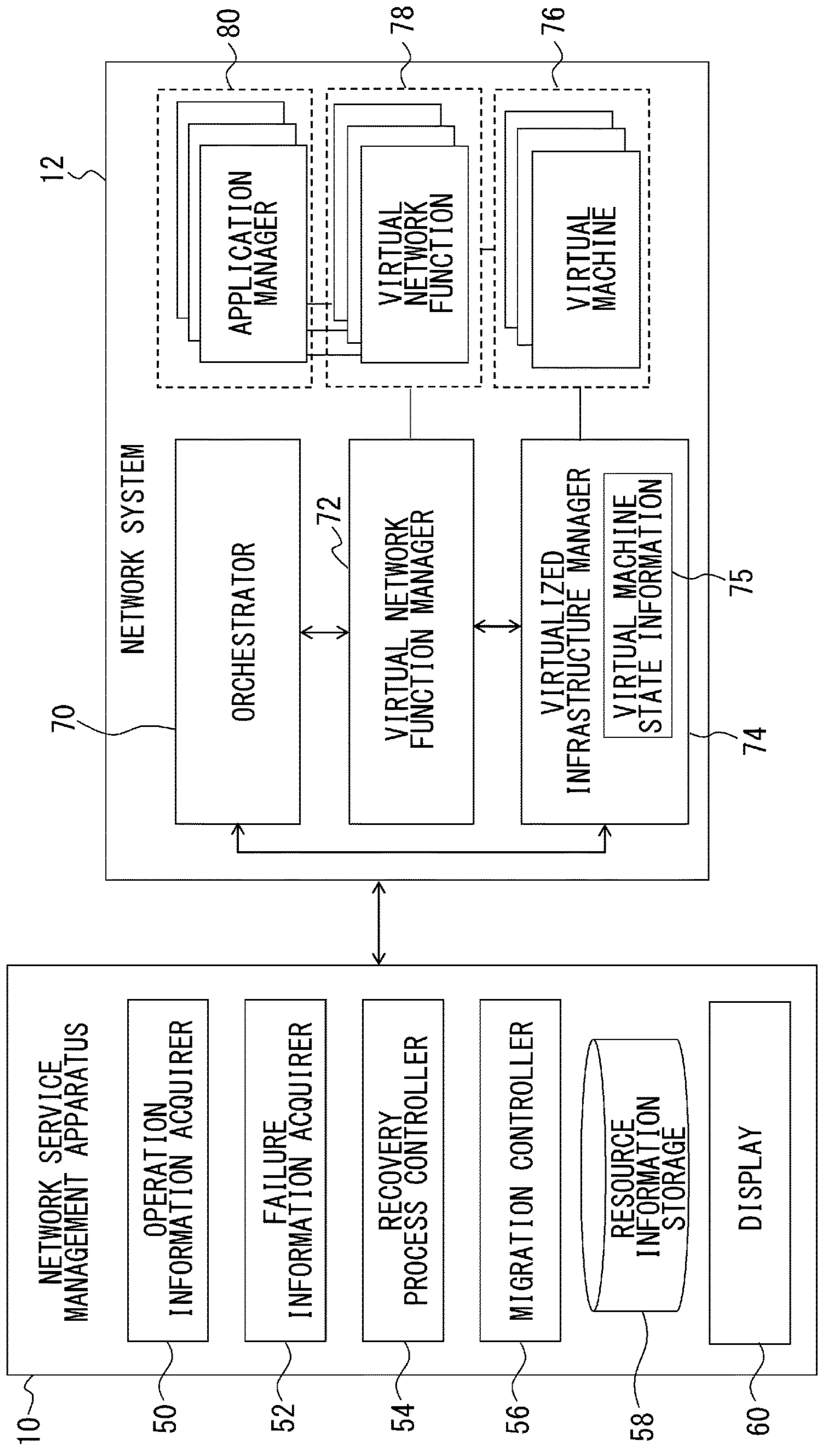
FIG. 3 is a diagram illustrating a functional block structure of the network service management apparatus and a functional block structure of a network system according to the present embodiment.

FIG. 3 is a diagram illustrating a functional block structure of the network service management apparatus 10 and a functional block structure of the network system according to the present embodiment. Each functional block illustrated in FIG. 3 may be implemented, in terms of hardware, via electronic components such as the CPU and the main memory illustrated in FIG. 2 and implemented, in terms of software, via a program loaded from a recording medium or the like into the main memory to provide various functions such as a data input/output function, a data retaining function, a computation function, and a communication function. Therefore, it is to be understood by those skilled in the art that these functional blocks may be implemented in various forms such as hardware only, software only, or a combination of hardware and software, and how to implement the functional blocks is not limited to any one of the above.

In FIG. 3, a network system 12 is similar in structure to the NFV architecture illustrated in FIG. 1. That is, an orchestrator 70, a virtual network function manager 72 (hereinafter, referred to as a VNF manager 72), and a virtualized infrastructure manager 74 (hereinafter, referred to as a VI manager 74) that belong to the network system 12 correspond to the orchestrator 222, the VNFM 224, and the VIM 220 illustrated in FIG. 1, respectively. A virtual network function 78 (hereinafter, referred to as a VNF 78) and an application manager 80 correspond to the VNF 202 and the EMS 204 illustrated in FIG. 1, respectively. A virtual machine 76 is a virtual machine implemented via the NFVI 206 illustrated in FIG. 1.

In particular, according to the present embodiment, the VNF manager 72 monitors the VNF 78 to detect an abnormality, and when the network service management apparatus 10 grants failure recovery permission, the VNF manager 72 acquires the failure recovery permission via the orchestrator 70 and performs the recovery process using a set procedure. At this time, the recovery process is performed using the procedure described in the above-described action 1 where when the attempt to boot the virtual machine fails, the virtual machine is redeployed. The VI manager 74 provides hardware state information in accordance with a request from the network service management apparatus 10.

Further, the VI manager 74 has virtual machine state information 75 stored in an internal storage area and updates the virtual machine state information in response to a life cycle event. Note that the virtual machine state information 75 corresponds to the NFVI resources 232 illustrated in FIG. 1. The VI manager 74 also updates the virtual machine state information 75 in accordance with a request from the network service management apparatus 10. Further, the VI manager 74 enables or disables hardware in accordance with a request from the orchestrator 70.

The orchestrator 70 exchanges a request or permission for the recovery process or enabling or disabling hardware with the network service management apparatus 10. The orchestrator 70 may further transmit, to the network service management apparatus 10, various parameters obtained throughout the life cycle, such as the amount of resources allocated to the VNF 78, at any time.

The network service management apparatus 10 includes an operation information acquirer 50 that acquires details of an operation performed by an operator, a failure information acquirer 52 that acquires information on a failure occurring in the network system 12, a recovery process controller 54 that controls the recovery process, a migration controller 56 that controls migration in response to hardware replacement, a resource information storage 58 that stores information on resources in the network system 12, and a display 60 that displays necessary information.

The operation information acquirer 50 acquires details of an operation performed by the operator, that is, an administrator of the network service, via an input device (not illustrated) such as a keyboard or a touchscreen. The failure information acquirer 52 acquires various notifications or requests related to the occurrence of a failure or the recovery process from the network system 12. The recovery process controller 54 controls the recovery process performed in the network system 12. Herein, as described above, the control corresponds to manipulating information or issuing various requests in order to increase the efficiency of the recovery process function originally implemented in the network system 12 according to a situation.

Specifically, the recovery process controller 54 identifies the type of a failure that has occurred and controls the recovery process so as to cause the recovery process to branch in accordance with the type. For example, as described above, when a failure for which reboot is ineffective occurs, the recovery process controller 54 accesses the VI manager 74 of the network system 12 to update the state information on a corresponding virtual machine, so as to shorten the waiting time required for reboot. Further, the recovery process controller 54 computes the amount of resources necessary for recovery when a failure is caused by hardware, detects hardware having the amount of resources, and starts the recovery process with the hardware thus detected used as an alternative.

The migration controller 56 performs control so as to allow function migration using a minimum procedure in response to the replacement of hardware that is a part of the network system 12. Specifically, detecting the necessity for replacing any hardware and disabling the virtual machine running on the hardware before replacement causes the VNF manager 72 of the network system 12 to detect an abnormality. This causes the VNF manager 72 to start the recovery process in which the virtual machine is built on hardware after replacement.

The resource information storage 58 stores a relationship among the VNF 78, the virtual machine 76 allocated to the VNF 78, hardware and the amount of resources used to implement the virtual machine 76, and the like. Further, information such as a host name, an installation location, and various addresses is stored as hardware information. When such information is changed due to, for example, instantiation of the NS, the information stored in the resource information storage 58 is updated in response to a notification of the change from the network system 12.

Further, the resource information storage 58 stores the information in such a manner as to make hardware having a failure distinguishable from other hardware. This prevents the recovery process controller 54 from repeatedly performing the recovery process on the same hardware. Further, sharing the information with the network system 12 prevents a new virtual machine from being deployed during recovery. Furthermore, when comparing the amount of resources necessary for recovery with the amount of available resources, defective hardware is excluded from computation targets. The display 60 causes a display device (not illustrated) to display various types of information on hardware, the VNF 78, and a failure, a graphical user interface (GUI) for receiving an operation performed by the operator, and the like as necessary.

Figure 4:
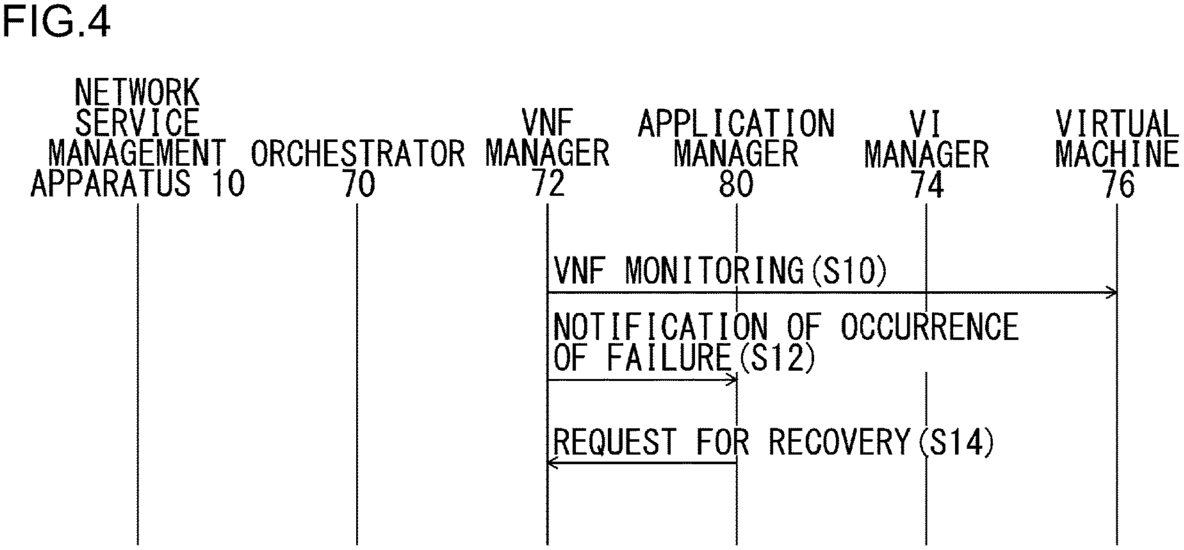
FIG. 4 is a sequence diagram illustrating procedures of a process of causing a VNF manager to detect a failure according to the present embodiment.

FIGS. 4 to 7 are sequence diagrams illustrating procedures of detecting a failure and recovering from the failure according to the present embodiment. First, FIG. 4 illustrates procedures of a process of causing the VNF manager 72 to detect a failure. The VNF manager 72 monitors an operation state of the virtual machine 76 or the VNF 78 in accordance with a set rule by, for example, periodically monitoring the reachability and the utilization of resources (S10). When any abnormality is detected, the VNF manager 72 notifies the application manager 80 associated with the VNF 78 of the detection of the abnormality (S12).

Then, the application manager 80 confirms the abnormality at the application level and requests the VNF manager 72 to perform the recovery process (S14). Note that as an alternative process procedure, the application manager 80 may monitor the VNF 78 or the virtual machine 76 at the application level and request, upon detection of an abnormality, the VNF manager 72 to perform the recovery process.

Figure 5:
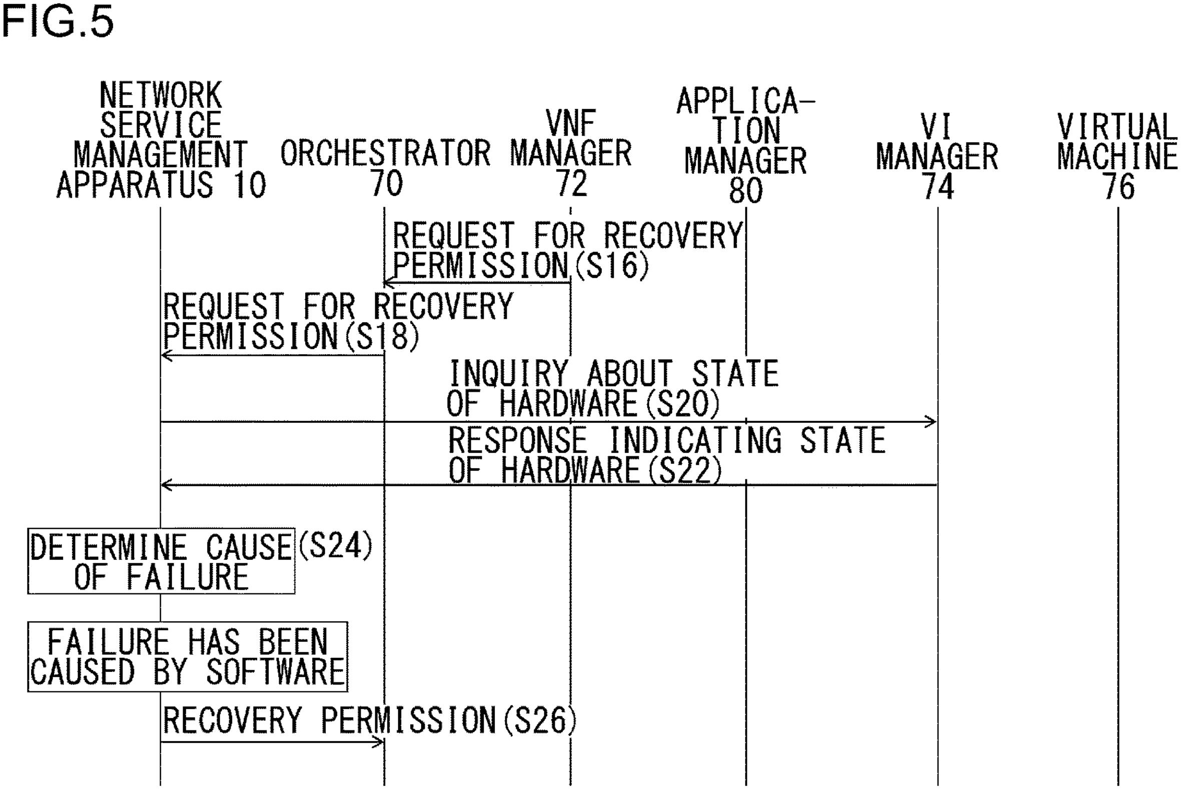
FIG. 5 is a sequence diagram illustrating procedures of an initial process for recovery performed after the procedure illustrated in FIG. 4.

FIG. 5 illustrates procedures of an initial process for recovery performed after the procedure illustrated in FIG. 4. Upon receipt of the recovery request, the VNF manager 72 requests the orchestrator 70 to permit the recovery process (S16). In response to the request, the orchestrator 70 requests the network service management apparatus 10 to permit the recovery process with designating the VNF 78 having the abnormality detected (S18). Identification information such as a universally unique identifier (UUID) is used to designate the VNF. Then, the failure information acquirer 52 of the network service management apparatus 10 searches the resource information storage 58 for the host name of the hardware corresponding to the VNF 78 thus designated.

At this time, the failure information acquirer 52 may store an operating location and UUID of the designated VNF 78 in the resource information storage 58, in association with the identification information generated for each recovery permission request. Recording such failure information allows the operator to check and analyze a failure history at any future timing. Further, the display 60 may cause the display device to display information representing the occurrence of the failure and details of the failure at any time in response to a request from the operator or the like.

Next, the failure information acquirer 52 makes an inquiry to the VI manager 74 of the network system 12 about the state of the hardware having the host name thus acquired (S20). This process is performed, for example, by calling an application programming interface (API) of software via which the VI manager 74 is implemented. Upon receipt of a response representing the state of the hardware from the VI manager 74 (S22), the failure information acquirer 52 determines whether the failure is caused by software or hardware on the basis of the information (S24).

For example, upon receipt of a notification, from the VI manager 74, of a state where hardware has some abnormality or the hardware cannot be accessed, the failure information acquirer 52 determines that the failure is caused by the hardware. Otherwise, the failure information acquirer 52 determines that the failure is caused by software. In the event of a failure caused by software, the recovery process controller 54 of the network service management apparatus 10 grants the orchestrator 70 of the network system 12 permission to perform the recovery process (S26). This causes the network system 12 to start the recovery process illustrated in FIG. 7.

Figure 6:
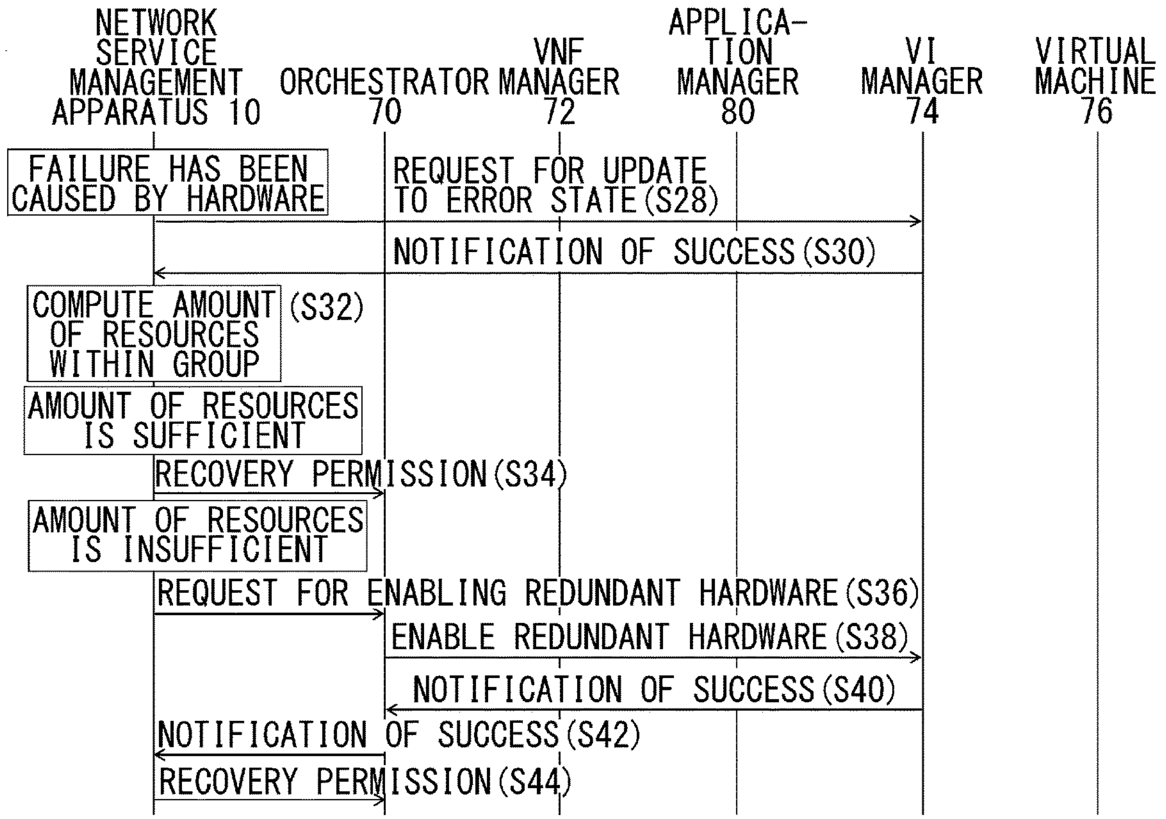
FIG. 6 is a sequence diagram illustrating procedures of a recovery process in the event of a failure caused by hardware, the steps being performed before the network service management apparatus grants permission to perform the recovery process according to the present embodiment.

FIG. 6 illustrates procedures of the recovery process in the event of a failure caused by hardware, the steps being performed before the network service management apparatus 10 grants permission to perform the recovery process. In the event of a failure caused by hardware, the recovery process controller 54 of the network service management apparatus 10 first requests the VI manager 74 to update the state of the virtual machine running on a corresponding server to "error" (S28). As illustrated in FIG. 4, even when the VNF manager 72 or the application manager 80 detects an abnormality in the VNF 78, there is typically no access to management information at the virtual machine level.

According to the present embodiment, the network service management apparatus 10 categorizes the cause of a failure from the outside and directly causes, when the failure is caused by hardware, the VI manager 74 serving as a management mechanism of the virtual machine to change the state information. As a result, even when the VNF manager 72 attempts to reboot as the normal recovery process, the attempt immediately fails, and a redeployment attempt as the next procedure is started. When Openstack, which is well-known free software, is used as the VI manager 74, the state of the virtual machine can be changed from "Active" to "Error" via an API (see, for example, "Virtual Machine State and Transitions" searched on the Internet on Oct. 21, 2020, <URL:https://docs.openstack.org/nova/latest/reference/vm-states.html>).

Under control at the VNF level, the state information on a virtual machine after the update requested in S28 is not limited to "error" as long as the state information causes the attempt to reboot the virtual machine to fail. When the state of a corresponding virtual machine has been successfully updated in the virtual machine state information 75, the VI manager 74 notifies the network service management apparatus 10 of the success (30). Then, the recovery process controller 54 of the network service management apparatus 10 determines whether the amount of resources necessary for recovery is available after replacement of the hardware having a failure with hardware belonging to the same group (S32).

Herein, the hardware belonging to the same group is, for example, hardware associated with the same type of functional unit among the functional units via which the network service is implemented, and is logically distinguished by setting information or the like. Examples of the functional units include a virtual distributed unit (vDU) and a virtual central unit (vCU), each of which is a component of a radio access network (RAN). When a sufficient amount of resources is available, the recovery process controller 54 grants the orchestrator 70 of the network system 12 permission to perform the recovery process (S34). This causes the network system 12 to start the recovery process illustrated in FIG. 7.

When a sufficient amount of resources is not available in the hardware belonging to the same group, the recovery process controller 54 uses redundant hardware as an alternative for recovery. Herein, the redundant hardware is, for example, a server in which system software corresponding to a specific type of functional unit, such as a host OS and basic input output system (BIOS) of a container execution environment, has not been set up.

In this case, the recovery process controller 54 requests the orchestrator 70 of the network system 12 to enable the redundant hardware (S36). For example, the recovery process controller 54 requests the orchestrator 70 to set up system software, which corresponds to a functional unit of a server having a failure, to the redundant hardware. This causes the orchestrator 70 to enable the redundant hardware through cooperation with the VI manager 74 (S38).

Specifically, the orchestrator 70 holds a script used for setup, such as a script in a specific type or a specific version which describes an installation procedure of a host OS serving as a base of the container execution environment, a procedure of configuring a kernel of the host OS, a procedure of configuring a BIOS, and the like. The orchestrator 70 executes the script to associate the redundant hardware with the group to which the hardware having a failure belongs and put the redundant hardware under the management of the VI manager 74.

Upon receipt of a notification about success in enabling from the VI manager 74 (S40), the orchestrator 70 transfers the notification to the network service management apparatus 10 (S42). In response to the notification, the recovery process controller 54 of the network service management apparatus 10 grants the orchestrator 70 permission to perform the recovery process. This causes the network system 12 to start the following recovery process.

Figure 7:
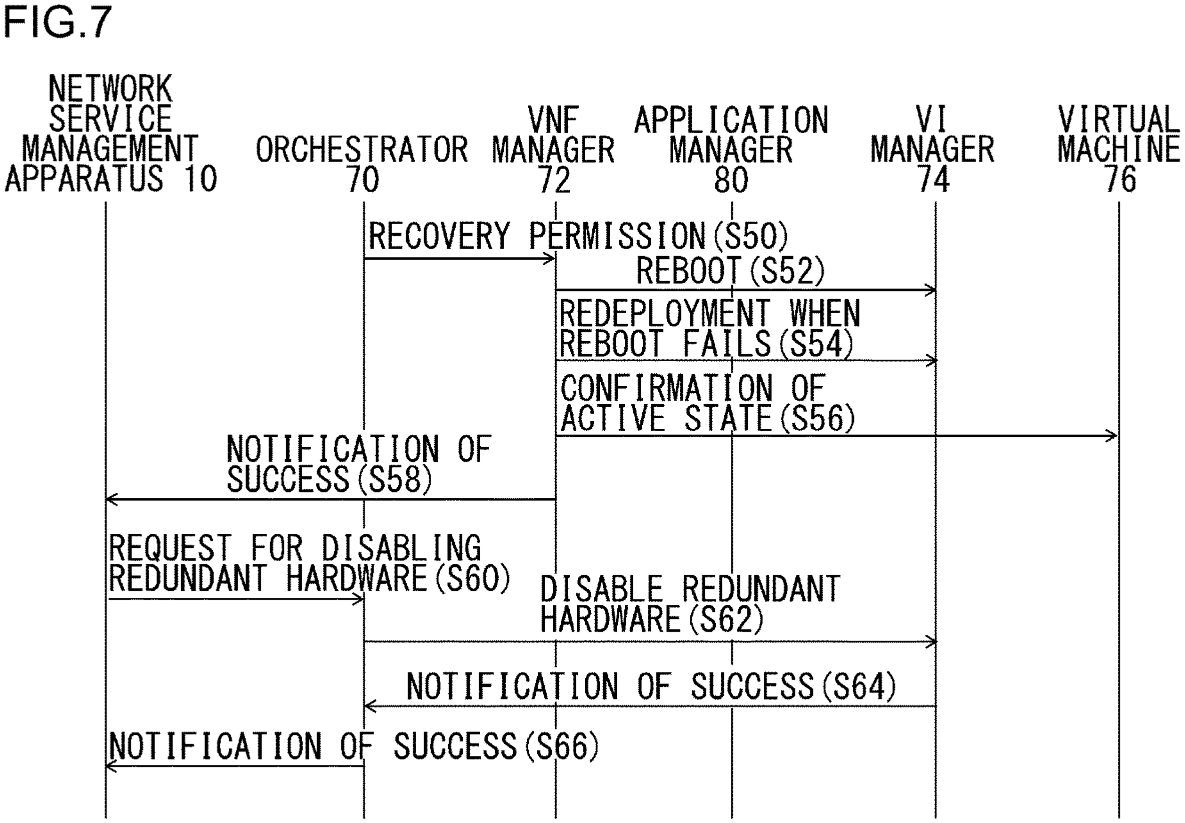
FIG. 7 is a sequence diagram illustrating procedures of the recovery process performed after the network service management apparatus grants the network system permission to perform the recovery process according to the present embodiment.

FIG. 7 illustrates procedures of the recovery process performed after the recovery process controller 54 of the network service management apparatus 10 grants the orchestrator 70 of the network system 12 permission to perform the recovery process in S26 of FIG. 5, S34 of FIG. 6, or S44 of FIG. 6. That is, when a failure is caused by software, or when a sufficient amount of resources is available within the same group and the redundant hardware is enabled in the event of a failure caused by hardware, the illustrated process is performed.

First, upon receipt of the permission to perform the recovery process from the network service management apparatus 10, the orchestrator 70 notifies the VNF manager 72 of the permission (S50). Then, the VNF manager 72 attempts to reboot the virtual machine via the VI manager 74 (S52). When the reboot fails, the VNF manager 72 attempts to redeploy the virtual machine via the VI manager 74 (S54). In the event of a failure caused by hardware, the virtual machine on the hardware is in the "error" state, so that the reboot in S52 immediately fails.

This causes, in S54, a virtual machine to be deployed to different hardware belonging to the same group or to an enabled redundant server in addition to the different hardware. In this process, the VNF manager 72 first deletes a virtual machine that is in the "error" state. Then, a new virtual machine is deployed using the same parameters as used for the deployment of the virtual machine thus deleted. As a result, the same virtual machine that is in the "active" state is built on the different hardware.

It goes without saying that when the reboot succeeds in S52, the redeployment in S54 is skipped. When the reboot or the redeployment succeeds, the state of the virtual machine is brought into the "active" state in any case. Upon confirmation of the "active" state (S56), the VNF manager 72 notifies the network service management apparatus 10 of the success (S58). When the redundant hardware is enabled in S38 of FIG. 6, the recovery process controller 54 of the network service management apparatus 10 requests the orchestrator 70 to disable the hardware (S60).

Herein, the disabling corresponds to data manipulation to prevent a virtual machine other than the virtual machine built for the recovery process from being built. That is, even after the disabling, the virtual machine deployed in S54 is kept in operation. Upon receipt of the disabling request, the orchestrator 70 disables the redundant hardware via the VI manager 74 (S62). When the disabling succeeds, the VI manager 74 notifies the orchestrator 70 of the success (S64), and the orchestrator 70 notifies the network service management apparatus 10 of the success (S66). The above-described process allows, even in the event of a failure caused by hardware, the system to return to normal in a time as short as possible.

FIG. 8 illustrates an example of information stored in the resource information storage 58 of the network service management apparatus 10. In this example, resource information 82 is information where physical and virtual classes of each of the various functions via which the network system 12 is implemented are associated with each other, and a failure occurrence status is further associated with the physical and virtual classes. Herein, as described above, pieces of hardware are classified into groups according to their functional units and the like. Then, with being associated with identification information on each piece of hardware belonging to each group, a host name, identification information on a virtual machine built on the hardware, identification information on a corresponding VNFC, identification information on a VNF implemented via the virtual machine and the VNFC, identification information representing the presence or absence of a failure, identification information on a cause of a failure, and detailed information on a failure are stored.

The failure information acquirer 52 updates the identification information on the presence or absence of a failure, the identification information on a cause of a failure, and the detailed information on a failure according to a situation. The identification information on the presence or absence of a failure is, for example, set to "1" when there is a failure and set to "0" when there is no failure. Even when there is a failure, the state may be further divided into a state before the recovery permission is issued and a state after the recovery permission is issued. Then, when the recovery is completed, the identification information is reset to "0". The identification information on a cause of a failure is, for example, set to "0" when the failure is caused by software, and set to "1" when the failure is caused by hardware.

The detailed information on a failure is, for example, information such as a failure occurrence date and time, a type of a failure, a type of recovery means, a recovery result, and a recovery date and time. Such detailed information may be separately associated with the identification information on a VNF, the identification information on a recovery permission request, and the like and stored as a failure history. Note that the illustrated data structure, the inclusion relationship among a virtual machine, a VNFC, a VNF, and hardware, the format of each piece of identification information, and the like are merely examples and are not intended to limit the present embodiment.

In any case, the network service management apparatus 10 by itself holds the information as illustrated in FIG. 8 and uses the information for identifying a virtual machine or hardware corresponding to a VNF having an abnormality and for the above-described recovery process. Note that all the information is not limited to being held by the network service management apparatus 10, and the information may be acquired as necessary through an inquiry to the network system 12.

Figure 9:
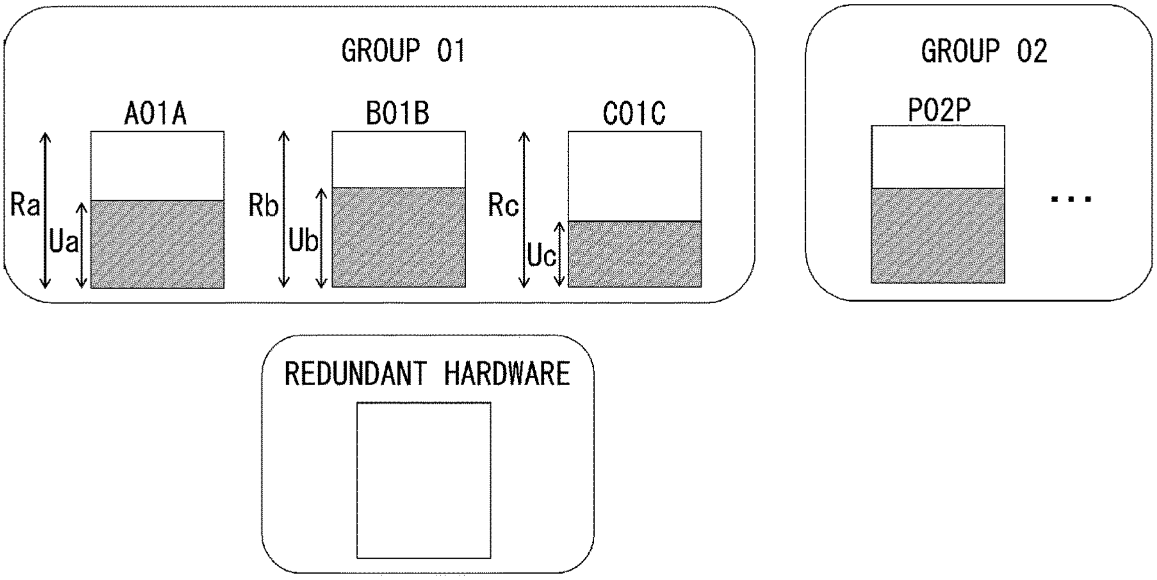
FIG. 9 is a diagram for describing how a recovery process controller determines whether the amount of resources necessary for recovery is available in S32 of FIG. 6.

FIG. 9 is a diagram for describing how the recovery process controller 54 determines whether the amount of resources necessary for recovery is available in S32 of FIG. 6. As described above, the recovery process controller 54 identifies and prepares hardware having an amount of available resources necessary for recovery from a failure caused by hardware, and then starts the recovery process. For this purpose, the resource information storage 58 of the network service management apparatus 10 stores various types of information on an amount of resources of each piece of hardware, an amount of resources in use, and redundant hardware together with the information illustrated in FIG. 8.

Herein, the "amount of resources" may vary in a manner that depends on the type of hardware such as the number of cores of the CPU, the storage capacity, and the communication bandwidth. Further, the "in use" is a state where allocation to another VNF is practically impossible, such as a state where allocation to a VNF has been already done or a state where allocation has been already reserved. In the illustrated example, three pieces of hardware, "A01A", "B01B", and "C01C" belong to a "group 01", and one or more pieces of hardware, "P02P", etc. belong to a "group 02". In addition, there is redundant hardware that belongs to neither of the groups.

Note that the number of groups and the number of pieces of redundant hardware are not limited to any specific number. The network system 12 has an actual resource pool having such a configuration, and the group configuration and the amount of resources in use vary in the life cycle. The resource information storage 58 of the network service management apparatus 10 stores the latest information on the group configuration and the amount of resources in use. In FIG. 9, the total amount of resources held by each hardware is represented by a rectangle, and the amount of resources in use is represented by a shaded area.

For example, the total amounts of resources held by the hardware "A01A", "B01B", and "C01C" are denoted by Ra, Rb, and Rc, respectively, and the amounts of resources in use are denoted by Ua, Ub, and Uc, respectively. Note that each group (for example, each aggregation) may be formed of some of the amounts of resources of each hardware. In this case, when the amounts of resources Ra, Rb, Rc are interpreted as the amount of resources belonging to the "group 01" among all the amount of resources held by each hardware, the following computation is performed in the same manner.

It is now assumed that a failure occurs in the hardware "B01B". Specifically, the failure information acquirer 52 identifies a host name corresponding to a VNF having the failure on the basis of the information illustrated in FIG. 8 and makes an inquiry to the VI manager 74 of the network system 12 to identify a cause of the failure as the hardware "B01B". Then, the recovery process controller 54 acquires the amount of resources Ub used in the hardware "B01B" as the amount of resources necessary for recovery.

Further, the amount of available resources is computed by subtracting the amount of resources of the hardware "B01B" having the failure from the total amount of resources R originally held by the "group 01" to which the hardware "B01B" belongs and further subtracting the amount of resources in use. In the illustrated example, an available space V is computed as follows:

$$R = (Ra + Rb + Rc)$$

$$V = R - Rb - (Ua + Uc).$$

When V≥Ub, the recovery process controller 54 determines that the amount of resources necessary for recovery is available in the same group and gives the network system 12 permission to perform the recovery process. In this case, the state of the virtual machine on the hardware "B01B" in the network system 12 is updated to "error" in S28 of FIG. 6, so that the attempt to reboot immediately fails. This causes the same virtual machine to be deployed using the available resources of the hardware "A01A" and "C01C".

On the other hand, when V<Ub, the recovery process controller 54 determines that the amount of resources necessary for recovery is not available in the same group. In this case, the recovery process controller 54 enables the redundant hardware as described above. This causes the redundant hardware to belong to the group 01. As a result, the reboot of the virtual machine on the hardware "B01B" immediately fails, and the same virtual machine is deployed to different hardware as described above, but the different hardware includes the redundant hardware in this case.

Thus the VNF having the failure returns to normal, but when the redundant hardware is used for recovery, it is desirable to free the redundant hardware by replacing the redundant hardware with hardware provided for normal operation so as to make the redundant hardware available for next failure recovery. Therefore, the migration controller 56 of the network service management apparatus 10 migrates the virtual machine running on the redundant hardware to different hardware using the failure recovery function of the network system 12.

When hardware is replaced, it is necessary to migrate all virtual machines built on hardware before replacement to different hardware. For this purpose, it is typical to go through a procedure of stopping all the NS, replacing hardware, and then performing instantiation again using hardware after replacement. In order to avoid such a large-scale functional stop, the migration controller 56 performs redeployment to hardware after replacement as part of the recovery process by deleting a virtual machine that needs to be migrated to cause the VNF manager 72 to detect an abnormality.

This makes it possible to replace hardware with only a minimum number of functions stopped. Specifically, the migration controller 56 has a function (hardware change information acquirer) of detecting the necessity of changing any of the hardware and a function (hardware change controller) of disabling the virtual machine associated with the hardware to be changed to start the recovery process.

Figure 10:
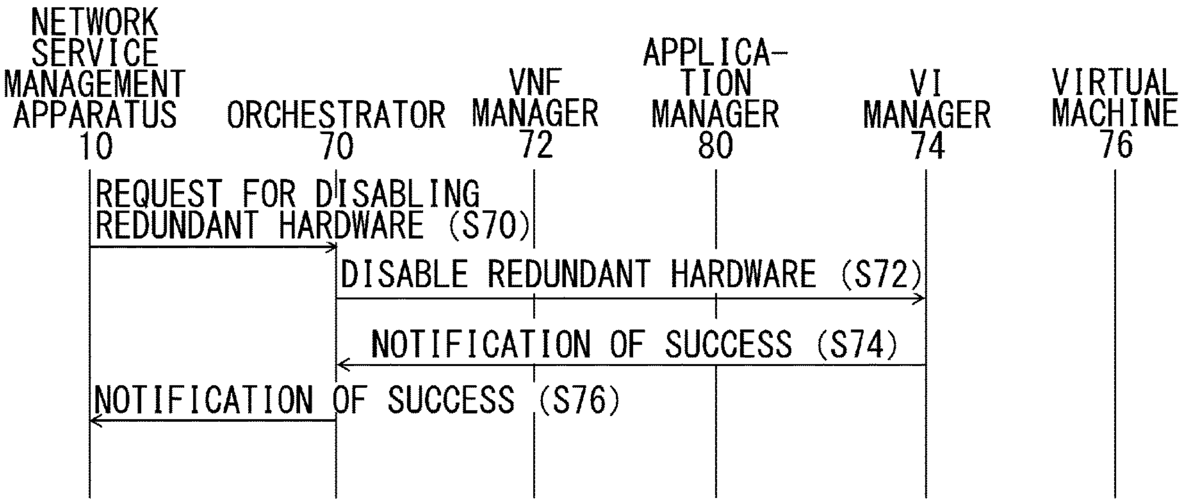
FIG. 10 is a sequence diagram illustrating procedures of a process of disabling redundant hardware in use according to the present embodiment.
Figure 11:
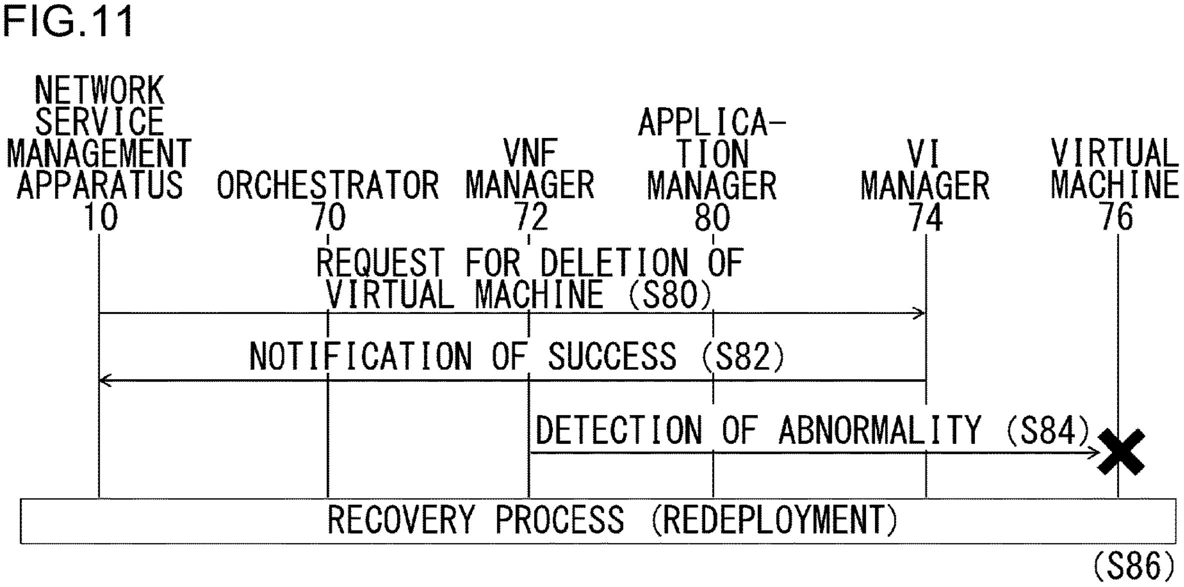
FIG. 11 is a sequence diagram illustrating procedures of a process of enabling migration to hardware after replacement according to the present embodiment.

When the redundant hardware is replaced with different hardware, a failure caused by hardware is artificially created by disabling the redundant hardware used for recovery. FIG. 10 illustrates procedures of a process of disabling redundant hardware in use. This process and the process illustrated in FIG. 11 are performed by the hardware change controller of the migration controller 56 when the hardware change information acquirer acquires a start request from the operator. Note that the redundant hardware and hardware after replacement are each set up as, for example, a specific functional unit and are incorporated in a group for use in operation.

Further, it is assumed that the redundant hardware remains enabled before the start of the process illustrated in FIG. 10. In response to a start operation performed by the operator or the like, the hardware change controller of the migration controller 56 requests the network system 12 to disable the redundant hardware (S70). Upon receipt of the request, the orchestrator 70 of the network system 12 disables the redundant hardware via the VI manager 74 (S72). When the disabling succeeds, the VI manager 74 notifies the orchestrator 70 of the success (S74), and the orchestrator 70 notifies the network service management apparatus 10 of the success (S76).

FIG. 11 illustrates procedures of a process of performing migration to hardware after replacement. In response to a start operation performed by the operator or the like, the hardware change controller of the migration controller 56 requests the VI manager 74 of the network system 12 to delete a virtual machine built on hardware before replacement (S80). This causes the VI manager 74 to delete the instance of the virtual machine and notify the network service management apparatus 10 of success in deletion (S82).

Herein, the "delete" is not limited to any specific process as long as a transition to a disabled state that the VNF manager 72 can detect as an abnormality is achieved. For example, an entry of a corresponding virtual machine in the virtual machine state information 75 may be deleted, or the virtual machine may be stopped. In such a state, the monitoring function of the VNF manager 72 detects an abnormality due to a failure in confirmation of the virtual machine (S84). As a result, the recovery process is required as illustrated in FIG. 4 and performed using the procedures illustrated in FIGS. 5 to 7 (S86).

Specifically, since the redundant hardware is disabled as illustrated in FIG. 10, it is determined in S24 of FIG. 5 that the failure has been caused by the redundant hardware. Further, since the hardware after replacement is set up and incorporated into the same group that the redundant hardware belongs to, it is determined in S32 of FIG. 6 that the amount of resources necessary for recovery is available in the same group. As a result, in S52 of FIG. 7, the reboot attempt immediately fails, and in S54, the redeployment to the hardware after replacement is performed. The above-described mechanism allows migration only from the virtual machine built on the redundant hardware to different hardware to be performed.

Note that this method is applicable not only to a case where redundant hardware used for failure recovery is replaced with different hardware but also to a case where hardware in use is replaced with different hardware for the purpose of maintenance or the like. Further, the hardware change information acquirer of the migration controller 56 may start the processes illustrated in FIGS. 10 and 11 by itself in response to a predetermined trigger. For example, the hardware change information acquirer of the migration controller 56 may determine the necessity of migration by itself at any stage of the life cycle managed by the network system 12. In this case, a condition requiring migration is set in the migration controller 56.

FIG. 12 illustrates a screen showing failure information displayed by the display 60 of the network service management apparatus 10. In this example, a failure information display screen 100 shows details and a status of a failure for each recovery permission request issued from the network system 12 in a list form. For each entry, a current state, identification information ("VNF ID") on a VNF having an abnormality detected, a type ("VNF Type") of the VNF, a failure cause, a name of a facility that is an installation location, a host name of a corresponding service, a UUID of the VNF, and a recovery means are associated with each other and shown.

Herein, the "state" represents whether the recovery process has not been started or is in progress, and the state where the recovery process has not been started is a stage where the recovery permission has not been issued after the network system 12 requests the permission. When it is determined that the failure has been caused by software or hardware in S24 of FIG. 5 that corresponds to the stage, the failure information acquirer 52 stores a result of the determination in the field of the failure cause ("cause"). Further, since recovery from a failure is made through reboot when the failure is caused by software and through deployment when the failure is caused by hardware, the failure information acquirer 52 stores either of the reboot and the deployment in the field of the "recovery means". The failure information acquirer 52 associates the other items with each other on the basis of information from the network system 12 and information stored in the resource information storage 58 and stores the items thus associated into the resource information storage 58.

Then, such information is displayed as the failure information display screen 100 at any time in response to a request from the operator, thereby allowing the operator to easily grasp the details of the failure that has occurred and the progress of the recovery process. Upon completion of the recovery process, the failure information acquirer 52 stores a status indicating whether the recovery process has succeeded, a failure occurrence date and time, and a recovery date and time, associated with the similar entry, into the resource information storage 58. In this case as well, the information is displayed as a failure occurrence history at any time in response to a request from the operator, thereby making the information usable for failure analysis or the like.

Figure 13A:
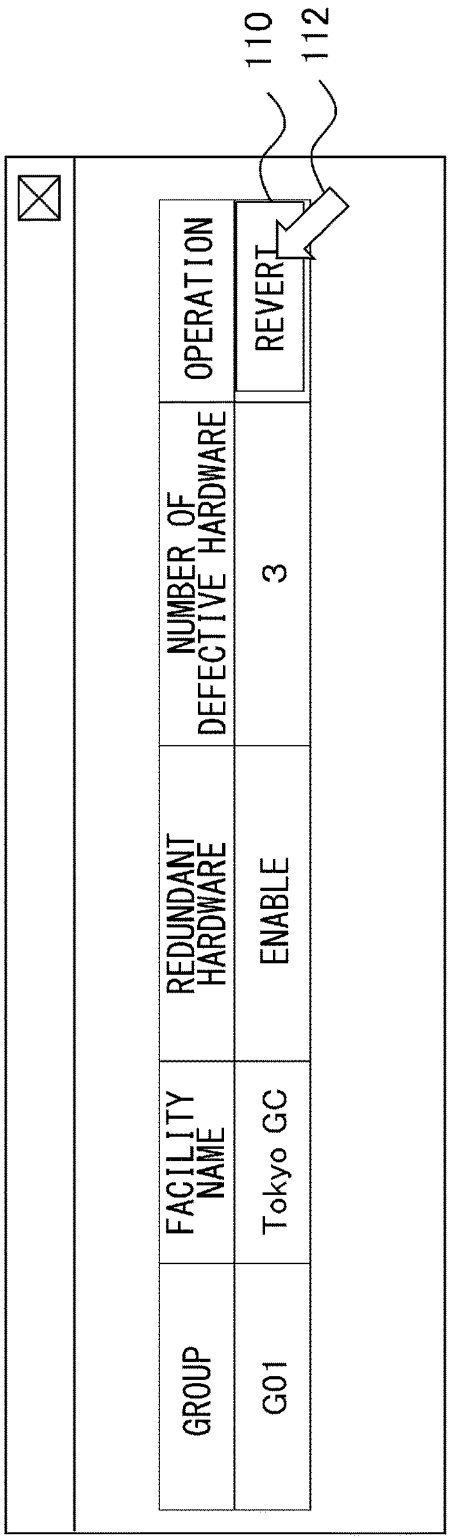
FIGS. 13A and 13B are diagrams illustrating an example of a screen displayed by the display of the network service management apparatus in order to receive an operation of enabling hardware after replacement during hardware replacement work according to the present embodiment.
Figure 13B:
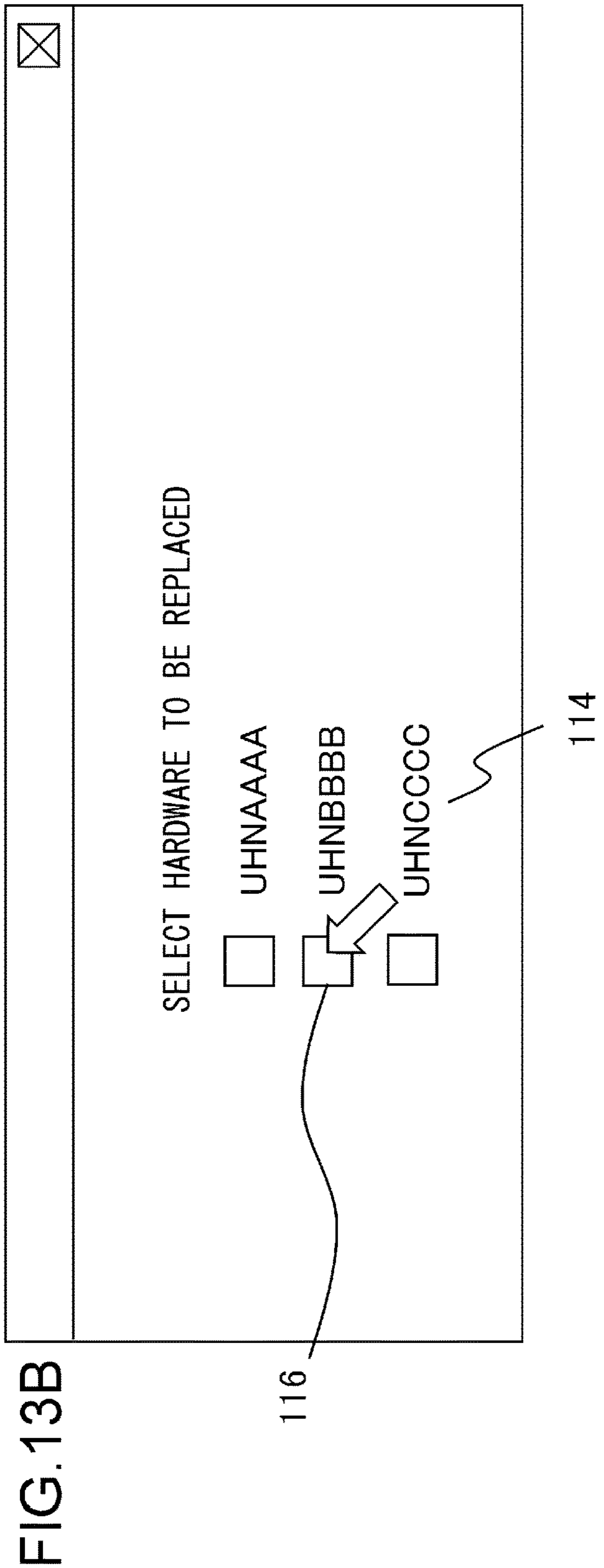

FIGS. 13A and 13B illustrate an example of a screen displayed by the display 60 of the network service management apparatus 10 in order to receive the operation of enabling hardware after replacement during hardware replacement work. This operation is performed, for example, as a pre-stage of the migration illustrated in FIGS. 10 and 11. First, the operator requests information on a hardware group that has been subjected to the recovery process. Then, the display 60 displays a state information screen of the group as illustrated in (a).

In this example, identification information on a group, a facility name, a status indicating whether redundant hardware is used, and the number of servers causing a failure are shown with the identification information, the facility name, the status, and the number of servers associated with each other. In the example illustrated in FIGS. 13A and 13B, the fact that redundant hardware is used for recovery is represented by the field of "redundant hardware" set to "enable". In FIGS. 13A and 13B, "3" represents the number of pieces of hardware having a failure in the same group. The screen further includes a field of "operation" that is performed to revert hardware having a failure from a viewpoint of the VI manager 74.

When the operator puts a cursor 112 or the like on the field, the display 60 causes a "revert" button 110 to appear as a GUI in the field. Herein, the "revert" means causing hardware determined to be defective to be recognized as being in the normal state under management. Specifically, the "revert" corresponds to assigning the host name of hardware having a failure to hardware after replacement and enabling the hardware after replacement. When the operator puts the cursor 112 or the like on the "revert" button 110, the display 60 displays a list of host names that are candidates for replacement as illustrated in (b).

In the illustrated example, there are three pieces of hardware having a failure, so that three host names (for example, host names 114) are displayed. When the operator selects one from the three host names and checks a corresponding check box (for example, a check box 116) using the cursor or the like, the hardware change information acquirer of the migration controller 56 receives the host name, and the hardware change controller notifies the network system 12 of the host name. This causes the orchestrator 70 to enable the hardware thus selected. That is, the hardware having the host name is put again under the management of the VI manager 74 to become available for subsequent construction of a virtual machine.

Figure 14:
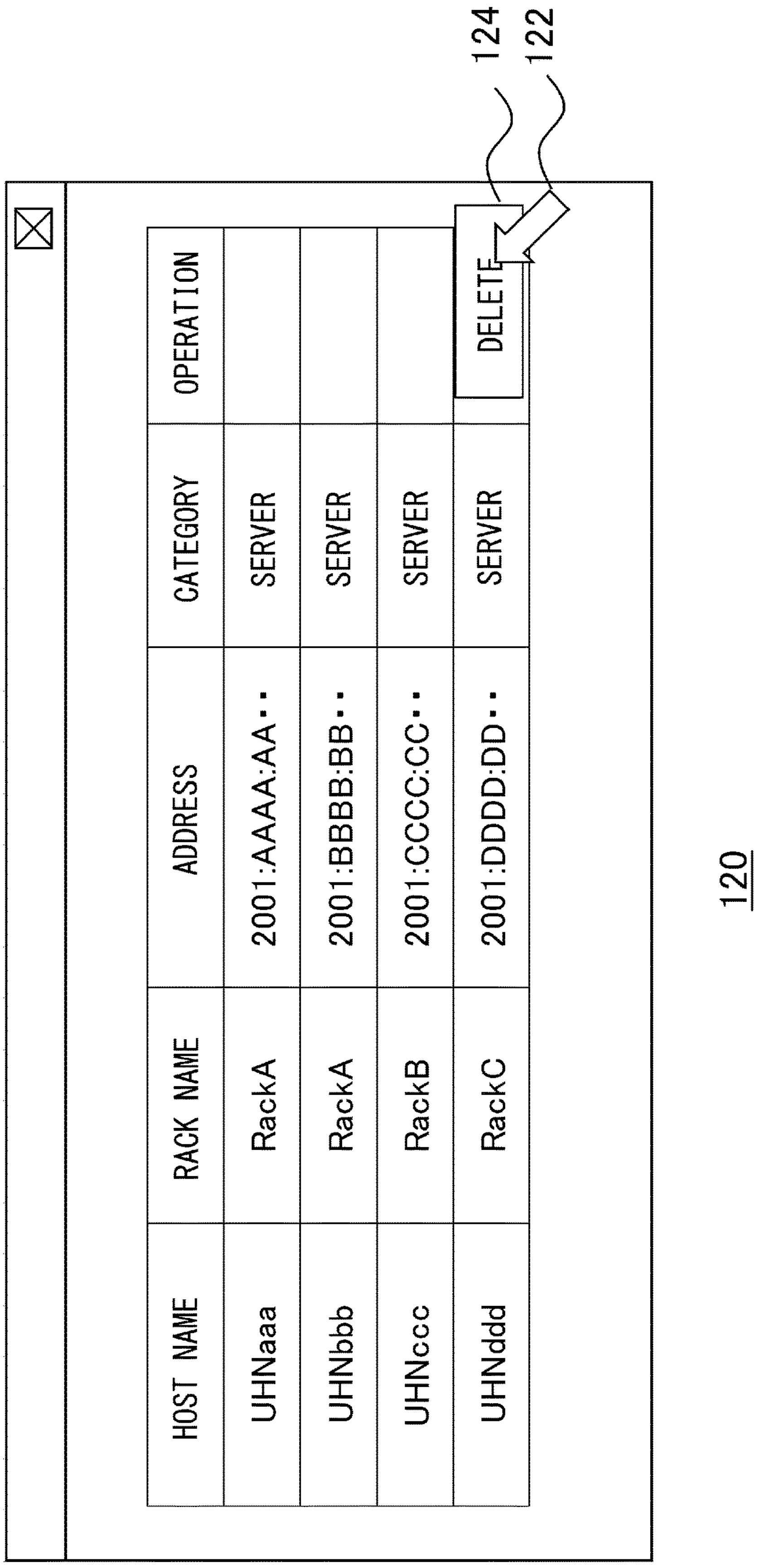
FIG. 14 is a diagram illustrating an example of a screen displayed by the display of the network service management apparatus in order to receive an operation of deleting a virtual machine according to the present embodiment.

FIG. 14 illustrates a screen displayed by the display 60 of the network service management apparatus 10 in order to receive an operation of deleting a virtual machine as a trigger to start the migration process illustrated in FIG. 11. First, when the operator inputs the designation of a facility or an area, the display 60 displays a hardware list screen 120 representing information on corresponding hardware in a list form. In this example, a host name of hardware, a name of a rack accommodating the hardware, an address, a type (category) of the hardware are shown with the host name, the name of a rack, the address, and the type associated with each other. Herein, the "address" field may accept a plurality of types of data such as IPv6 and IPv4.

The screen further includes a field of "operation" that is performed to delete a virtual machine built on any hardware. When the operator puts a cursor 122 or the like on the field, the display 60 causes a "delete" button 124 to appear as a GUI in the field. When the operator further puts the cursor 122 or the like on the "delete" button 124, the hardware change controller of the migration controller 56 issues a delete request to delete a virtual machine associated with appropriate hardware as illustrated in S80 of FIG. 11.

Specifically, the hardware change controller of the migration controller 56 may request the VI manager 74 for the UUID of a VNF running on the hardware selected on the hardware list screen 120 to obtain the identification information on a corresponding virtual machine, and then issue the delete request. Subsequently, as the remaining process illustrated in FIG. 11 continues, the virtual machine built on the selected hardware is migrated to, for example, different hardware enabled as illustrated in FIGS. 13A and 13B. Note that the screens and operation method illustrated in FIGS. 12 to 14 are merely examples and are not intended to limit the present embodiment.

According to the above-described present embodiment, manipulating the information held in the network system having the original failure recovery scheme from the outside makes downtime during failure recovery or hardware replacement shorter. For example, when a failure occurs, a cause of the failure is categorized, and then the recovery process is performed in a manner that depends on the cause. Accordingly, the recovery process defined regardless of failure causes adjusts to a failure cause, thereby allowing recovery from any failure to be made in a short time.

For example, in the event of a failure caused by hardware, updating the state information on a corresponding virtual machine to "error" causes the reboot attempt defined as the first stage of the recovery process to immediately fails and causes the recovery process to proceed to the redeployment defined as the second stage. This makes it possible to avoid wasteful time while strictly adhering to the original procedure of the recovery process. Even in this case, the recovery process for a failure caused by software is not affected, so that recovery from various failures can be made without waste.

Further, holding the repository outside the network system makes it possible to compute, when a failure occurs in hardware, the amount of resources necessary for recovery and identify different hardware that can provide the amount of resources. Then, only when the resource of the active pieces of hardware belonging to the same group is insufficient, redundant hardware is used as an alternative. This makes the possibility of recovery higher even when the number of pieces of redundant hardware is small, and avoiding the necessity for setting up redundant hardware as much as possible allows a reduction in time required for the setup.

Furthermore, when active hardware such as redundant hardware is replaced with different hardware, the network system is requested to delete a virtual machine built on the hardware before replacement. This causes the network system to detect an abnormality to autonomously perform deployment to hardware after replacement that has been separately set up. This in turn allows migration of a virtual machine using the mechanism of the recovery process and allows hardware replacement during a pinpoint stop.

Note that, for the measures including causing the recovery process to branch in accordance with the categorized cause of a failure, updating the state information on a virtual machine in the event of a failure caused by hardware, detecting a repository-based alternative, and performing migration in response to deletion of a virtual machine described in the present embodiment, the larger the number of combinations, the higher the process efficiency. On the other hand, even when any one of the measures is applied alone, a corresponding effect is produced as described above. Therefore, according to the present embodiment, it is not limited to either the application of any one of the measures alone or the application of two or more of the measures in combination.

The present invention has been described on the basis of the embodiment. It is to be understood by those skilled in the art that the embodiment is illustrative and that various modifications are possible for a combination of components or processes, and that such modifications are also within the scope of the present invention.

INDUSTRIAL APPLICABILITY

As described above, the present invention is applicable to various systems that provide network services in a data center or the like, a management device of such a system, a device that supports management of such a system, and the like.

REFERENCE SIGNS LIST

10 network service management apparatus, 12 network system, 23 CPU, 26 main memory, 32 communication unit, 34 storage unit, 36 output unit, 38 input unit, 40 recording medium driver, 50 operation information acquirer, 52 failure information acquirer, 54 recovery process controller, 56 migration controller, 58 resource information storage, 60 display, 70 orchestrator, 72 virtual network function manager, 74 virtualized infrastructure manager, 75 virtual machine state information, 76 virtual machine, 78 virtual network function, 80 application manager

The invention claimed is:

1. A network service management apparatus comprising:

one or more processors, wherein the one or more processors are configured to implement:

a hardware change information acquirer structured to detect a hardware to be changed via which a network service in operation is implemented; and a hardware change controller structured to delete a virtual machine that is built on the hardware to be changed and via which a functional unit of the network service is implemented to cause a manager structured to monitor the network service to detect the deletion and activate a recovery function for redeploying the virtual machine on a replacement hardware, wherein the recovery function causes a reboot attempt to immediately fail based on whether a failure of the network service is due to hardware or software, reducing wait time for a timeout of the reboot.

2. The network service management apparatus according to claim 1, wherein the hardware change controller requests a virtualized infrastructure manager to delete the virtual machine, the virtualized infrastructure manager belonging to a network system including the functional unit and being structured to manage the virtual machine.

3. The network service management apparatus according to claim 1, wherein the hardware change information acquirer detects necessity of replacing redundant hardware with another hardware, the redundant hardware being used for recovery from a hardware failure previously occurred.

4. The network service management apparatus according to claim 3, wherein the hardware change information acquirer detects the necessity on the basis of an operation performed by an operator.

5. The network service management apparatus according to claim 4, wherein the hardware change information acquirer receives an operation performed by the operator of selecting a host name of the replacement hardware to which the virtual machine is migrated, from a host name of failed or changed hardware.

6. The network service management apparatus according to claim 1, wherein the hardware change controller requests an orchestration unit structured to control the network service to disable redundant hardware before change.

7. The network service management apparatus according to claim 1, wherein a network system including the functional unit has a recovery process function of redeploying the virtual machine that belongs to the network system, and the hardware change controller causes redeployment of a virtual machine that has been deleted to enabled hardware during the recovery process.

8. The network service management apparatus of claim 1, wherein the hardware change controller is configured to delete the virtual machine in order to trigger detection of an abnormality and activate the recovery function.

9. A network service management method comprising:

detecting a hardware to be changed via which a network service in operation is implemented; and deleting a virtual machine that is built on the hardware to be changed and via which a functional unit of the network service is implemented to cause a manager structured to monitor the network service to detect the deletion and activate a recovery function for redeploying the virtual machine on a replacement hardware, wherein the recovery function causes a reboot attempt to immediately fail based on a determination of whether a failure of the network service is due to hardware or software, reducing wait time for a timeout of the reboot.

10. A non-transitory computer-readable recording medium storing a program for causing a computer to execute processing comprising:

detecting a hardware to be changed via which a network service in operation is implemented; and deleting a virtual machine that is built on the hardware to be changed and via which a functional unit of the network service is implemented to cause a manager structured to monitor the network service to detect the deletion and activate a recovery function for redeploying the virtual machine on a replacement hardware, wherein the recovery function causes a reboot attempt to immediately fail based on a determination of whether a failure of the network service is due to hardware or software, reducing wait time for a timeout of the reboot.

* * * * *